United States Patent
Eicher et al.

(10) Patent No.: US 9,844,291 B2
(45) Date of Patent: Dec. 19, 2017

(54) COFFEE MACHINE

(71) Applicant: Eugster/Frismag AG, Amriswil (CH)

(72) Inventors: Heinz Eicher, Jona (CH); Marek Sidor, Uerikon (CH)

(73) Assignee: Eugster/Frismag AG, Amriswil (CH)

( * ) Notice: Subject to any disclaimer, the term of this patent is extended or adjusted under 35 U.S.C. 154(b) by 434 days.

(21) Appl. No.: 14/407,486

(22) PCT Filed: Apr. 12, 2013

(86) PCT No.: PCT/EP2013/057721
§ 371 (c)(1),
(2) Date: Dec. 12, 2014

(87) PCT Pub. No.: WO2013/185945
PCT Pub. Date: Dec. 19, 2013

(65) Prior Publication Data
US 2015/0157167 A1 Jun. 11, 2015

(30) Foreign Application Priority Data
Jun. 12, 2012 (DE) .................... 20 2012 102 131 U

(51) Int. Cl.
*A47J 31/42* (2006.01)
*A47J 42/06* (2006.01)
(Continued)

(52) U.S. Cl.
CPC .............. *A47J 31/42* (2013.01); *A47J 42/06* (2013.01); *A47J 42/10* (2013.01); *A47J 42/38* (2013.01)

(58) Field of Classification Search
CPC .. A47J 31/42; A47J 42/10; A47J 42/02; A47J 42/06
(Continued)

(56) References Cited

U.S. PATENT DOCUMENTS

| 5,542,342 A | 8/1996 | McNeill et al. |
| 7,273,005 B2 | 9/2007 | Turi |

(Continued)

FOREIGN PATENT DOCUMENTS

| DE | 44 18 139 | 2/1995 |
| DE | 10 2006 032 710 | 1/2008 |

(Continued)

OTHER PUBLICATIONS

International application No. PCT/EP2013/057721 search report dated Jul. 5, 2013.

*Primary Examiner* — Reginald L Alexander
(74) *Attorney, Agent, or Firm* — Bachman & LaPointe, PC

(57) ABSTRACT

A coffee machine comprising a coffee machine housing, having a coffee mill (2) comprising a grinder (6) for grinding coffee beans (32) to coffee grounds (33) and having a brewing device (35) having a brewing chamber (34) which is adjustable between a filling position and a brewing position for subjecting the coffee grounds (33) to extraction with hot water to produce a coffee drink, wherein associated with the coffee mill (2) is an electric motor (1) by means of which a grinding ring (8) of the grinder (6) can be driven rotatably about an axis of rotation (13) relative to a grinding cone (7) disposed radially within the grinding ring (8) by means of a shaft (14) spaced apart from the axis of rotation (13), in order to grind the coffee beans (32) between the grinding ring (8) and the grinding cone (7), wherein the shaft (14) is disposed such that said shaft extends perpendicular to the axis of rotation (13), and wherein in the filling position the brewing chamber (34) is disposed axially below the grinder outlet (31), in such a way that the axis of rotation (13) passes through the grinder outlet (31) and the brewing chamber (34), such that under the effect of gravity ground coffee powder can be discharged axially from the grinder (6)

(Continued)

into the brewing chamber (34), and that the electric motor is arranged radially adjacent to the grinding ring (8).

14 Claims, 4 Drawing Sheets

(51) Int. Cl.
*A47J 42/10* (2006.01)
*A47J 42/38* (2006.01)

(58) Field of Classification Search
USPC ..... 99/286, 290; 241/169.1, 168, 100, 101.2
See application file for complete search history.

(56) References Cited

U.S. PATENT DOCUMENTS

| | | | | |
|---|---|---|---|---|
| 8,430,021 | B2* | 4/2013 | Remo | A47J 31/42 99/275 |
| 8,776,671 | B2* | 7/2014 | Van Os | A47J 31/42 99/286 |
| 2008/0098901 | A1* | 5/2008 | Lee | A47J 42/56 99/286 |
| 2009/0127363 | A1* | 5/2009 | Malykke | A47J 42/40 241/248 |
| 2010/0095852 | A1* | 4/2010 | Remo | A47J 31/42 99/280 |
| 2010/0170971 | A1* | 7/2010 | Doglioni Majer | A47J 42/38 241/30 |

FOREIGN PATENT DOCUMENTS

| | | |
|---|---|---|
| WO | 2010/125438 | 4/2010 |
| WO | 2012/001592 | 1/2012 |

\* cited by examiner

Prior Art

COFFEE MACHINE

BACKGROUND OF THE INVENTION

The invention relates to a coffee machine with a grinder, i.e. a so-called bean-to-cup coffee machine.

Coffee machines with a grinder are known, in which a rotatably arranged cone is driven by a horizontally lying electric motor relative to a rotatably fixed grinding ring. In such a configuration, the discharge of the ground powder takes place tangentially or respectively laterally. This entails a complex guidance of powder towards the grinder, whereby powder deposits and blockages of the powder guidance can occur. Furthermore, owing to the long transport, a static charge of the grinder occurs, which in turn leads to adhesions, which is disadvantageous with regard to the quality of the coffee, because with each grinding preferably freshly ground powder is to be extracted in the brewing chamber without residues of the previous grinding, which may have taken place a long time previously.

In addition, coffee machines are known in which it is not the grinding cone, but rather a grinding ring arranged coaxially thereto, which is rotatable by means of an electric motor, wherein the grinding ring is driven by a vertically arranged motor, the motor shaft of which then runs parallel to the axis of rotation of the grinding ring. The large space requirement in vertical direction and the restricted placing variants, resulting therefrom, for the motor-grinder combination within coffee machine housings are a disadvantage in such a configuration.

DE 44 18 139 C1 shows a coffee mill for use in coffee machines, wherein the coffee mill is with a rotatable grinding ring, which is rotatable via a drive shaft running parallel to the rotation axis.

DE 10 2006 032 710 A1 shows a coffee mill, in which likewise it is not the grinding ring, but rather the grinding cone which is driven rotatably, wherein the drive shaft for rotating the cone runs perpendicularly to the axis of rotation. The drive motor is situated beneath with a considerable distance from the combination of grinding ring and grinding cone.

U.S. Pat. No. 7,273,005 B2 describes a coffee mill without a grinding cone arranged radially within a grinding ring. The coffee beans are ground here in a region axially between two grinding discs.

In a coffee mill known from US 2010/0170971 A1, a motor shaft of a drive motor runs parallel to the axis of rotation of the grinder.

From U.S. Pat. No. 5,542,342 a coffee machine with a grinder of unknown construction is known, wherein the grinder is driven by a drive shaft which probably runs perpendicularly to the rotation axis. The coffee beans are fed eccentrically, i.e. an axis of rotation of the grinder does not pass through a coffee bean outlet. The coffee machine does not have a brewing device with a brewing chamber which is adjustable between a filling position and a brewing position.

From WO 2010/125438 A2 a distribution device for distributing flows of coffee grounds is known.

WO 2012/001592 A1 describes a brewing unit with a brewing chamber which is adjustable between a filling position and a brewing position. A coffee mill is associated with the brewing unit.

SUMMARY OF THE INVENTION

Proceeding from the above-mentioned prior art, the invention is based on the problem of indicating a coffee machine, in particular a so-called bean-to-cup coffee machine, in which the path of the freshly ground coffee powder from the exit of the coffee mill into the brewing chamber is as short as possible, wherein at the same time a compact and flexible structure of the coffee machine is to be made possible—in particular a space-saving and variable arrangement of the combination of coffee mill and electric motor is to be ensured.

This problem is solved by a coffee machine with the features disclosed herein. Advantageous further developments of the invention are also indicated herein. All combinations of at least two features disclosed in the description, the claims and/or the figures fall within the scope of the invention.

The invention is based on the idea, in a coffee machine in which an external grinding ring is able to be driven via the electric motor relative to the stationary grinding cone, of arranging the shaft, via which the grinding ring is able to be driven by the electric motor, perpendicularly and radially spaced with respect to the imaginary axis of rotation of the grinding ring running through the stationary grinding cone, about which axis the grinding ring is rotatable. The shaft is the shaft of the electric motor or an extension aligned axially herewith in the case of a multipart shaft structure. As a further essential feature, provision is made to arrange the outlet of the grinder such that it is situated axially directly above the brewing chamber, when the latter is pivoted into its filling position, wherein then the axis of rotation of the grinding ring passes through both the grinder outlet and also the brewing chamber, preferably centrally, so that the coffee powder produced by means of the coffee mill by grinding coffee beans is able to be discharged, due to gravity, axially out from the grinder into the brewing chamber, in particular such that the powder can fall directly axially from the grinder into the brewing chamber which is situated in the filling position. Through the combination of a motor shaft arranged perpendicularly to the axis of rotation of the grinding ring with a grinder outlet arranged directly above the brewing chamber, a particularly space-saving configuration is presented, in which the path of the coffee powder out from the grinder into the brewing chamber is minimized and at the same time a variable possibility exists for the positioning of the arrangement of grinder and electric motor in circumferential direction in relation to a vertical axis of the brewing chamber. The proposed coffee machine preferably manages without a lateral guide for coffee powder, because such a chute construction is not required, as the coffee powder can fall directly out from the grinder downwards into the brewing chamber, wherein the peripheral angle position of the arrangement of grinder and electric motor is able to be selected relatively freely, as the vertical extent thereof parallel to the axis of rotation is small and therefore a configuration of the coffee machine in a region laterally to the brewing chamber does not have to be taken into consideration. Furthermore, the small vertical extent and the variable positionability of the grinder-electric motor combination minimizes the space requirement of the entire "inner workings" of the coffee machine, whereby the overall volume of the coffee machine housing is able to be reduced considerably compared with known housings. Preferably, the vertical extent of the combination of grinder and electric motor, in particular of a shared housing which is to be further explained later, amounts to a maximum of one third, more preferably a maximum of one quarter of the maximum longitudinal extent of the combination, in particular of the housing, perpendicularly to the axis of rotation.

In further development of the invention, provision is advantageously made that the combination of grinder and electric motor is arranged exclusively in a region above the filling position of the brewing chamber. In other words, provision is made according to the further development that neither the grinder nor the electric motor are arranged radially adjacent to the brewing chamber in the filling position. Hereby, a maximum degree of freedom is achieved with regard to the placing of the combination of grinder and electric motor.

With regard to a facilitated assembly and a further minimizing of the space requirement, in the further development of the invention provision is made to integrate the grinder and the electric motor as a structural unit. For this purpose, a shared housing, preferably embodied as a plastic injection-moulded housing, which surrounds both the electric motor and also the grinder, is associated with the combination of grinder and electric motor. The housing preferably has a shaft mount section for a shaft section, in particular a spindle section of the shaft on the end side, and a pin for the arrangement, in particular fitting on, of the grinding cone, wherein the longitudinal extent of the pin and the longitudinal extent of the shaft mount section of the housing are preferably oriented perpendicularly to one another.

An embodiment of the housing is particularly preferred when the latter is composed of a total of two plastic shells, constructed respectively as a housing injection moulded part.

It is structurally particularly advantageous with regard to reducing the required components if the grinding cone is secured on the shared housing, and namely via a fixing screw aligned perpendicularly to the shaft or respectively with the rotation axis of the grinding ring, which passes through a preferably central opening of a preferably worm-like coffee bean guide. The latter serves to guide the coffee beans which have been drawn into the grinder by means of the grinding ring.

An embodiment is particularly expedient, in which the grinding ring is arranged so as to be axially adjustable for setting the degree of fineness of the ground material.

For this, it is particularly expedient to arrange the grinding ring, preferably arranged in a rotatably fixed manner in a grinding ring mount, so as to be rotatable via a rolling bearing relative to the housing, in particular with respect to a rolling body guide arranged in a rotatably fixed manner in relation to the housing, wherein then there is associated with the rolling body guide an adjustment ring, preferably surrounding the rolling body guide, which is in engagement or respectively operatively connected with the rolling body guide such that a turning of the adjustment ring results in the desired axial adjustment of the rolling body guide with the grinding ring received therein relative to the stationary grinding cone. A possibility for converting the turning movement of the adjustment ring into an axial adjustment movement of the rolling body guide consists in allowing the adjustment ring and rolling body guide to cooperate via an internal/external thread combination.

Preferably, the adjustment ring is provided on its outer periphery with an adjustment ring toothing, which is able to be actuated manually. Additionally or alternatively, a servomotor, cooperating for example via a toothed wheel or a threaded worm with the adjustment ring toothing, can be arranged, in order to be able to adjust the degree of grinding automatically, i.e. electromotively.

For minimizing vibrations, it is particularly expedient if the grinding ring mount and/or the rolling body guide rest(s) via at least one damping element on the shared housing or on a component which is secure with respect to the housing.

Particularly preferably, damping elements are arranged on sides of the rolling bodies facing away from one another, in particular roller balls.

BRIEF DESCRIPTION OF THE DRAWINGS

Further advantages, features and details of the invention will emerge from the following description of preferred example embodiments and with the aid of the drawings. These show in.

In the figures, identical elements are marked by identical reference numbers.

DETAILED DESCRIPTION

Figure 1:
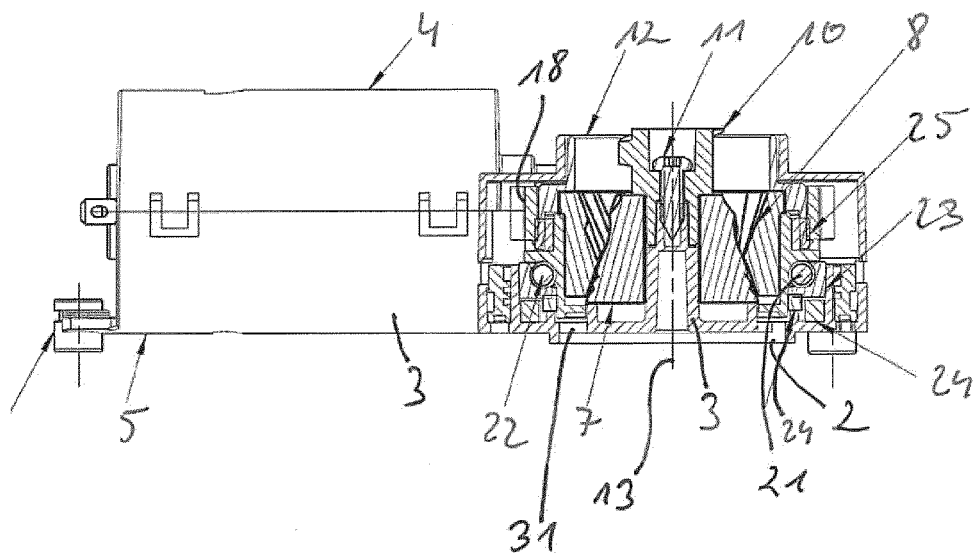
FIGS. 1 and 2 two sectional views of a coffee mill/electric motor combination, FIGS. 3a and 3b different perspective views of the combination according to FIGS. 1 and 2, FIG. 4 an exploded illustration of the combination according to FIGS. 1 to 3, FIG. 5 a relative arrangement of the combination of coffee mill and brewing unit, and FIG. 6 a relative arrangement of coffee mill with electric motor relative to the brewing unit according to the prior art.

In FIGS. 1 to 4, the combination of an electric motor 1 and of a coffee mill 2 is shown in different illustrations realized partially in section or as exploded illustration. The above-mentioned combination has a shared housing 3, which is formed from two plastic injection moulded housing shells 4, 5 locked in place with one another. Both the electric motor 1 and also the coffee mill 2 are held in the housing 3. The coffee mill 2 comprises a grinder 6 with a central, stationary grinding cone 7 and a grinding ring 8, opening upwards and arranged coaxially thereto, which is rotatable indirectly via the electric motor 1. The grinding cone 7 sits in a rotatably fixed manner on a central pin 9 of the housing 3 and is fixed to the housing in a rotatably fixed manner via a coffee bean guide 10 (guide component), constructed as an inlet worm, and a fixing screw 11, wherein the coffee bean guide 10 is passed through axially by the screw 11 and is screwed into an upper, narrowed pin section, onto which the coffee bean guide 10 is fitted.

As can be seen from FIG. 1, the coffee bean guide 10 sits centrally in a grinder inlet 12, which is annular in top view, which is delimited radially externally by a grinding ring cover projecting into the upper housing shell 4.

As can be seen in addition from the figures, the fixing screw 11 or respectively the grinding cone 7 is passed through centrally by an imaginary axis of rotation 13, about which the grinding ring 8 is able to be turned around the grinding cone 7.

Figure 2:
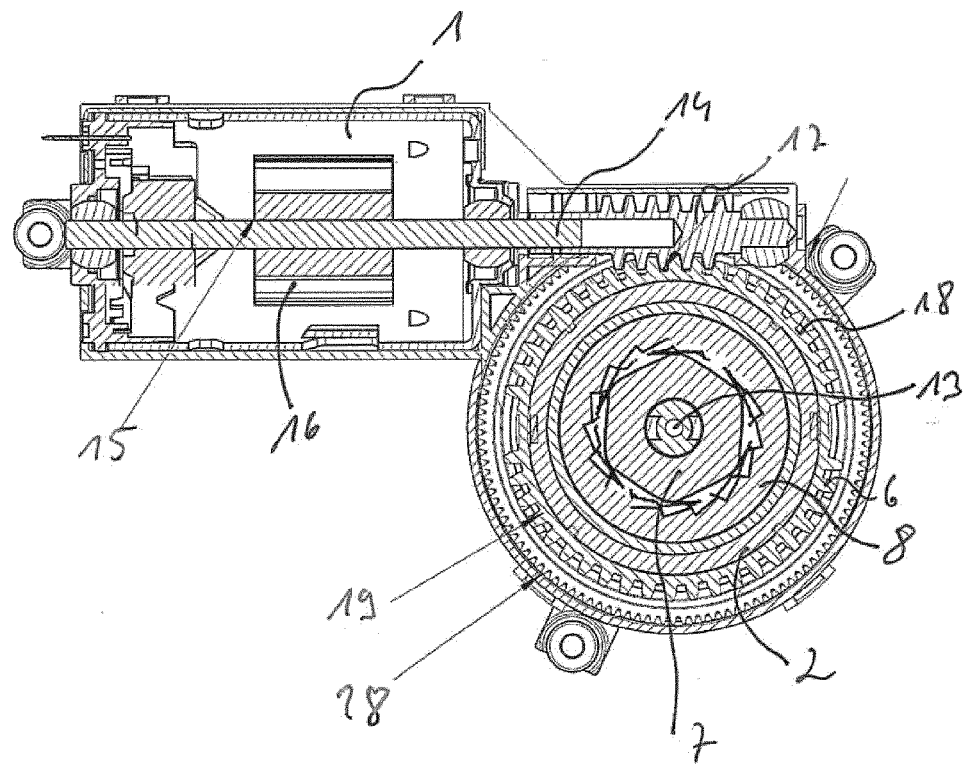

As can be seen from FIG. 2, a shaft 14 is provided for driving the grinding ring 8, which shaft runs tangentially with respect to the grinding ring and therefore perpendicularly with respect to the axis of rotation 13. The shaft 14 is formed in a left-hand region in the plane of the drawing by a motor shaft 15, on which a rotatable armature 15 sits in a rotatably fixed manner. The shaft 14 has in a right-hand section in the plane of the drawing a worm section 17, which is in engagement with an output toothing 18. In the example embodiment which is shown, the output toothing is provided on a grinding ring mount 19, within which the grinding ring 8, which is preferably made from ceramic or metal, is held in a rotatably fixed manner.

The grinding ring mount, constructed as a plastic injection moulded part, is mounted rotatably via a rolling bearing 21, constructed in the example embodiment shown as a ball bearing, with rolling bodies 22, with respect to a rolling body guide 23 held in a rotatably fixed manner in the housing, which rolling body guide is embodied as a plastic injection moulded part in the example embodiment which is shown. The rolling body guide 23 rests, in the plane of the drawing at the bottom, on the housing via an annular damping element 24. In the example embodiment which is shown, the damping element 24 is embodied as a foam ring. Via a further damping element 25, which is likewise embodied as a foam ring, the grinding ring mount 19 rests at the top in the plane of the drawing on the grinding ring cover 20 and radially externally on the output toothing 18.

The shared housing 3 has a shaft mount section 26, in which the worm section 17 of the shaft 14 is able to be received. The shaft section 26 is aligned with an electric motor section 27 to receive the electric motor 1. The axis of rotation 13 is surrounded in sections by the pin 9, so that the longitudinal extent of the pin 9 and the longitudinal extent of the shaft section 26 run at right-angles to one another and with a radial distance to one another.

The grinding ring 9 is adjustable axially relative to the fixedly arranged grinding cone. For this purpose, an adjustment ring 28 is provided with an adjustment ring toothing 29, wherein in the example embodiment which is shown, the adjustment ring toothing 29 is able to be grasped and rotated manually. On its inner circumference the adjustment ring 28 has an internal thread 30, which is in engagement with a corresponding external thread of the annular rolling body guide 23, so that a turning of the adjustment ring 28 leads to an upward or downward movement of the rolling body guide 23 and consequently of the entire rolling bearing 21, of the grinding ring mount 19 and of the grinding ring 9.

Figure 3A:
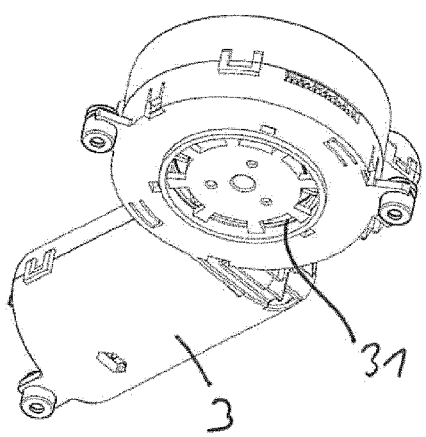
Figure 3B:
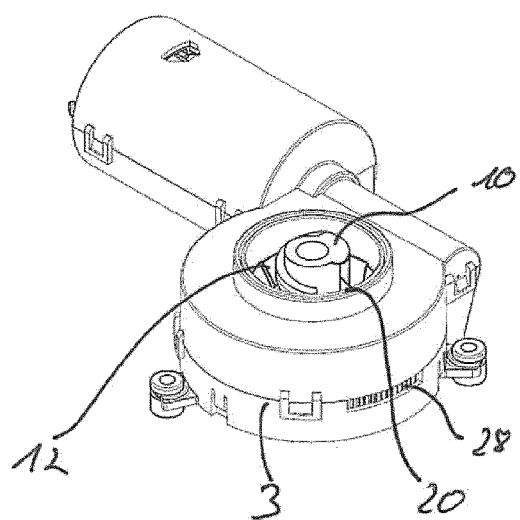
Figure 4:
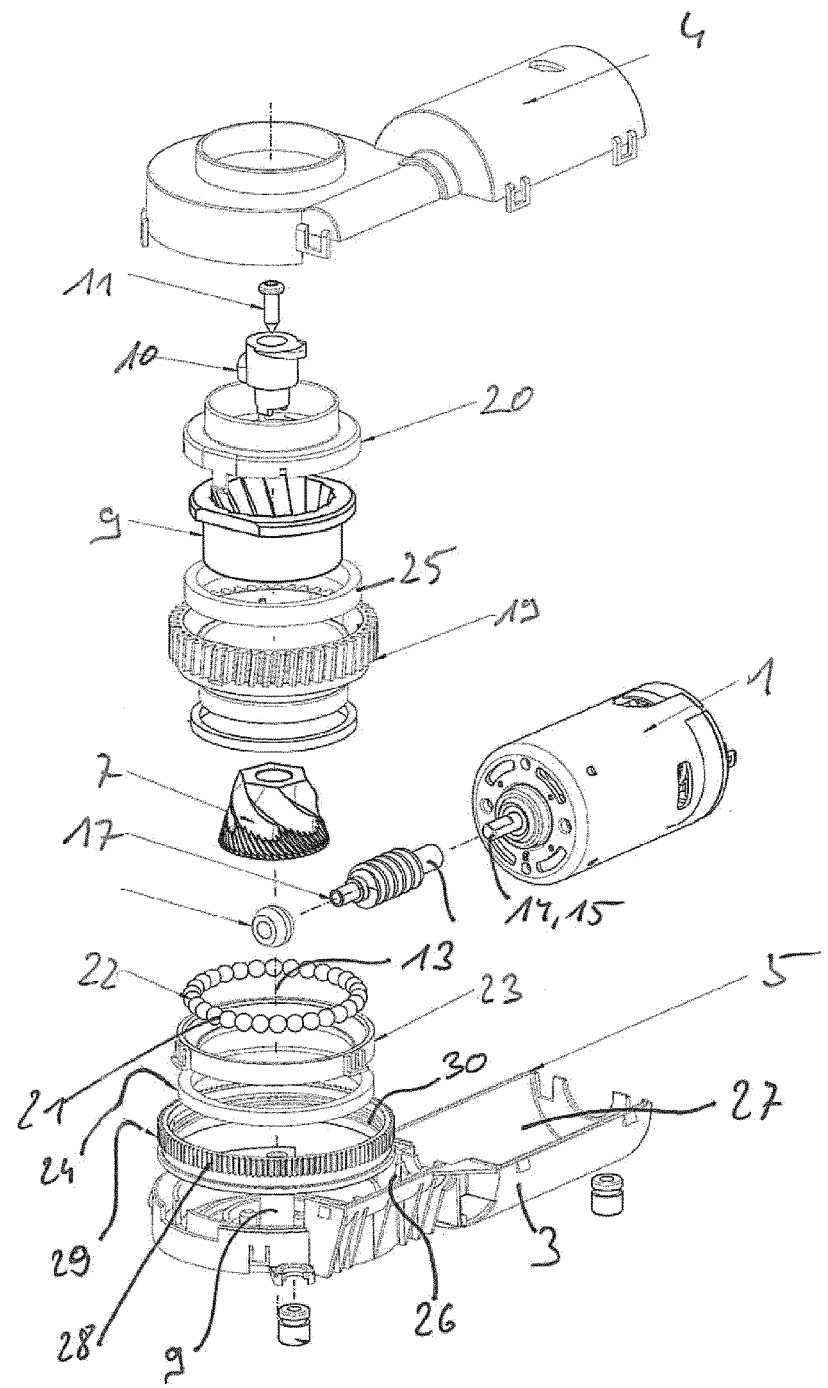

As can be seen from viewing FIGS. 3a and 1 together, the housing 3 comprises a lower grinder outlet 31, which consists of several openings arranged in an annular form, which are arranged in a region beneath the grinding ring 8, wherein the ground coffee powder can fall downwards from above through the grinder outlet 31. The grinder outlet 31 is arranged coaxially to the axis of rotation 13. The grinder outlet 31 sits on a housing side facing away from the grinder inlet 12.

Figure 5:
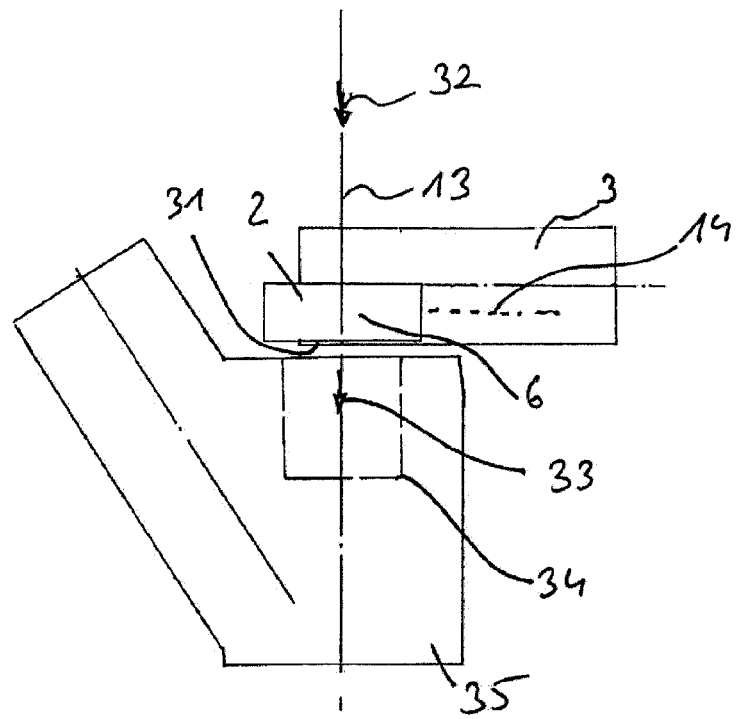

Within the coffee machine, the combination of electric motor 1 and coffee mill 2 is arranged with its shared housing 3, preferably as shown in FIG. 5, namely such that coffee beans 32 fed to the grinder inlet 12 can be ground within the grinder 6 and can then be discharged in axial direction out from the grinder as coffee grounds 33, and namely parallel to the axis of rotation 13 of the grinder 6, more precisely of the grinding ring 8. The shaft 14, running perpendicularly to the axis of rotation 13, of the drive for the grinder 6 is indicated in FIG. 5.

It can be seen from FIG. 5 that the combination of electric motor 1 and coffee mill 2 is arranged entirely above a brewing chamber 34 of a brewing device 35, when the brewing chamber 34 is situated in its illustrated filling position. The brewing chamber 34 can be pivoted toward the left in the plane of the drawing into a brewing position in a known manner within the brewing device 35, in which position it is able to be closed by a brewing piston.

It can be seen from the configuration shown in FIG. 5 that the coffee grounds 33 can fall downwards in the plane of the drawing parallel to the axis of rotation 6 out from the grinder outlet 31 into the brewing chamber 34. As can be seen in addition from FIG. 5, the axis of rotation 13 not only passes centrally through the grinder 6, but also passes through the brewing chamber 34, preferably centrally as shown. It can be seen from this that the shaft 14 also runs perpendicularly to the vertical extent or respectively longitudinal extent of the brewing chamber 34 in its filling position.

Figure 6:
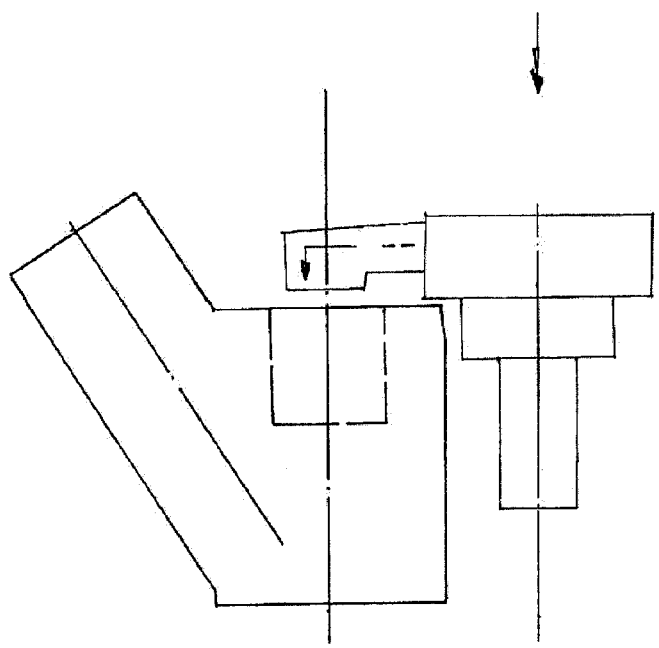

A comparison with FIG. 6, which shows a configuration according to the prior art, reveals immediately the advantageous nature of an embodiment according to the invention, because owing to the parallel arrangement of the motor shaft to the brewing chamber axis and to the axis of rotation of the grinder, a great requirement for space in a region adjacent to the brewing device results, and the coffee grounds must be discharged laterally via guides towards the brewing chamber, which can be dispensed with in a configuration according to the invention.

The invention claimed is:

1. A coffee machine comprising a coffee machine housing, having a coffee mill (2) comprising a grinder (6) for grinding coffee beans (32) to coffee grounds (33) and having a brewing device (35) having a brewing chamber (34) which is adjustable between a filling position and a brewing position for subjecting the coffee grounds (33) to extraction with hot water to produce a coffee drink, wherein associated with the coffee mill (2) is an electric motor (1) by means of which a grinding ring (8) of the grinder (6) can be driven rotatably about an axis of rotation (13) relative to a grinding cone (7) disposed radially within the grinding ring (8) by means of a shaft (14) spaced apart from the axis of rotation (13), in order to grind the coffee beans (32) between the grinding ring (8) and the grinding cone (7), wherein the shaft (14) is disposed such that said shaft extends perpendicular to the axis of rotation (13), and wherein in the filling position the brewing chamber (34) is disposed axially below the grinder outlet (31), in such a way that the axis of rotation (13) passes through the grinder outlet (31) and the brewing chamber (34), such that under the effect of gravity ground coffee powder can be discharged axially from the grinder (6) into the brewing chamber (34), and that the electric motor is arranged radially adjacent to the grinding ring (8).

2. The coffee machine according to claim 1, wherein the grinder (6) and electric motor (1) are arranged exclusively in a region above the filling position of the brewing chamber (34).

3. The coffee machine according to claim 1, wherein a shared housing (3), arranged within the coffee machine housing, is provided for the electric motor (1) and the grinder (6).

4. The coffee machine according to claim 3, wherein in the shared housing (3), a shaft mount section (26) for a shaft section of the shaft (14) and a pin for the arrangement of the grinding cone (7) are provided, such that the longitudinal extents of the shaft mount and of the pin (9) are oriented perpendicularly to one another.

5. The coffee machine according to claim 3, wherein the grinding cone (7) is secured on the shared housing (3) via a fixing screw (11) oriented perpendicularly to shaft (14), which fixing screw passes through a preferably central opening of a preferably worm-like coffee bean guide (10).

6. The coffee machine according to claim 1, wherein the grinding ring (8) is arranged so as to be adjustable axially relative to the grinding cone (7).

7. The coffee machine according to claim 1, wherein the grinding ring (8) is arranged in a grinding ring mount (19), which is rotatable via a rolling bearing (21) relative to a rolling body guide (23), and wherein an adjustment ring (28) is associated with the rolling body guide (23), which adjustment ring is in engagement with the rolling body guide (23)

such that a turning of the adjustment ring (28) leads to an axial adjustment of the rolling body guide, of the grinding ring mount (19) and of the grinding ring (8) relative to the grinding cone (7).

8. The coffee machine according to claim 7, wherein an adjustment ring toothing (29) is associated with the adjustment ring (28), which toothing is able to be grasped manually and/or is coupled with a servomotor for the automatic adjustment of the adjustment ring (28).

9. The coffee machine according to claim 7, wherein the grinding ring mount (19) and/or the rolling body guide (23) rest(s) on the shared housing (3) via at least damping element (24, 25).

10. The coffee machine according to claim 1, wherein a drive, in particular an electric motor for adjusting the brewing chamber between the filling position and the brewing position is associated with the brewing device.

11. The coffee machine according to claim 7, wherein a central longitudinal axis of the brewing chamber, which in the filling position of the brewing chamber (34) is preferably in alignment with the axis of rotation of the grinder, forms an angle with the axis of rotation (13) of the grinder in the brewing position.

12. The coffee machine according to claim 1, wherein the shaft (14) has a worm section (17) which engages into a circumferential output toothing (18) of a grinding ring mount (19) or of the grinding ring (8).

13. The coffee machine according to claim 1, wherein the axis of rotation (13) passes through the grinder outlet (31) and the brewing chamber (34) centrally.

14. The coffee machine according to claim 3, wherein the shared housing (3) is formed from two plastic housing shells.

* * * * *